(12) United States Patent
Estevadeordal et al.

(10) Patent No.: US 10,132,688 B2
(45) Date of Patent: Nov. 20, 2018

(54) SYSTEM AND METHOD FOR DETECTING SPALL WITHIN A TURBINE ENGINE

(75) Inventors: Jordi Estevadeordal, Saratoga Springs, NY (US); Guanghua Wang, Clifton Park, NY (US); Lucy Joelle Summerville, Greenville, SC (US); Nirm Velumylum Nirmalan, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 438 days.

(21) Appl. No.: 12/972,169

(22) Filed: Dec. 17, 2010

(65) Prior Publication Data

US 2012/0153157 A1    Jun. 21, 2012

(51) Int. Cl.
| | | |
|---|---|---|
| G01J 5/02 | (2006.01) | |
| G01J 5/00 | (2006.01) | |
| G01J 5/08 | (2006.01) | |
| G01J 5/60 | (2006.01) | |

(52) U.S. Cl.
CPC ............. *G01J 5/026* (2013.01); *G01J 5/0088* (2013.01); *G01J 5/025* (2013.01); *G01J 5/0803* (2013.01); *G01J 5/0806* (2013.01); *G01J 5/089* (2013.01); *G01J 5/0821* (2013.01); *G01J 5/0859* (2013.01); *G01J 5/0862* (2013.01); *G01J 5/0893* (2013.01); *G01J 5/602* (2013.01)

(58) Field of Classification Search
USPC .............................. 250/339.04; 374/127, 144
See application file for complete search history.

(56) References Cited

U.S. PATENT DOCUMENTS

| 4,326,798 A | * | 4/1982 | Kahn ............................. 356/45 |
|---|---|---|---|
| 4,411,519 A | | 10/1983 | Tagami |
| 4,574,172 A | | 3/1986 | Burack et al. |
| 5,498,484 A | * | 3/1996 | Duderstadt ............... C23C 4/02 |
| | | | 148/240 |
| 5,822,222 A | | 10/1998 | Kaplinsky et al. |
| 6,513,971 B2 | | 2/2003 | Tubbs |
| 6,698,920 B1 | | 3/2004 | Maylotte et al. |

(Continued)

FOREIGN PATENT DOCUMENTS

| EP | 1849539 | 10/2007 |
|---|---|---|
| JP | 5633518 A | 4/1981 |

(Continued)

OTHER PUBLICATIONS

Chang et al., "Determination of the wavelength dependence of refractive indices of flame soot," Proceedings of the Royal Society, Series A, 430(1880):577-591, 1990.

(Continued)

*Primary Examiner* — David Porta
*Assistant Examiner* — Shun Lee
(74) *Attorney, Agent, or Firm* — GE Global Patent Operation; Pabitra Chakrabarti

(57) ABSTRACT

In one embodiment, a system includes a multi-spectral pyrometry system configured to receive a broad wavelength band radiation signal from a turbine component, to split the broad wavelength band radiation signal into multiple narrow wavelength band radiation signals, to determine emissivity of the turbine component based on the narrow wavelength band radiation signals, and to detect spall on a surface of the turbine component based on the emissivity.

8 Claims, 5 Drawing Sheets

(56) References Cited

U.S. PATENT DOCUMENTS

| | | | |
|---|---|---|---|
| 6,786,635 | B2 | 9/2004 | Choi |
| 7,633,066 | B2 | 12/2009 | Antel, Jr. et al. |
| 9,046,411 | B2 | 6/2015 | Wang et al. |
| 2004/0179575 | A1* | 9/2004 | Markham .................... 374/121 |
| 2005/0247066 | A1* | 11/2005 | Myhre ............................ 60/803 |
| 2007/0258807 | A1* | 11/2007 | Brummel ..................... 415/118 |
| 2007/0290131 | A1 | 12/2007 | Antel et al. |
| 2008/0223832 | A1 | 9/2008 | Song et al. |
| 2009/0228230 | A1 | 9/2009 | Jammu et al. |
| 2009/0285259 | A1 | 11/2009 | Allen et al. |

FOREIGN PATENT DOCUMENTS

| | | |
|---|---|---|
| JP | 5642118 A | 4/1981 |
| JP | 60165524 A | 8/1985 |
| JP | 0459345 U | 5/1992 |
| JP | 04242128 A | 8/1992 |
| JP | 05164615 A | 6/1993 |
| JP | 07146179 A | 6/1995 |
| JP | 0882225 A | 3/1996 |
| JP | 0953992 A | 2/1997 |
| JP | 2004219114 A | 8/2004 |
| JP | 2009047611 A | 3/2009 |
| JP | 2009216093 A | 9/2009 |
| WO | 2004010094 | 1/2004 |

OTHER PUBLICATIONS

Khan et al., "Noncontact temperature measurement, i. interpolation based techniques." Rev. Sci. Instrum., 62 (2):392-402, 1991.

Khan et al., "Noncontact temperature measurement, ii. least squares based techniques." Rev. Sci. Instrum., 62 (2):403-409, 1991.

LeMieux,"On-Line Thermal Barrier Coating Monitoring for Real-Time Failure Protection and Life Maximization," U.S. Department of Energy, National Energy Technology Laboratory, Apr. 2002, pp. 1-22; Orlando, FL.

MODEST, "Refractive Heat Transfer," Academic Press, 2nd edition, 2003, pp. 8-9.

U.S. Appl. No. 12/750,425, filed Mar. 30, 2010, Jordi Estevadeordal.

Cassady et al. "High Accuracy Multi-color Pyrometry for High Temperature Surfaces", IEPC paper: IEPC-03-79 presented at the 28th International Electric Propulsion Conference in Toulouse, France, Mar. 17-21, 2003, pp. 1-9.

http://www.alt-vision.com/color_prisms_tech_data.htm, Published on the Internet by Alternative Vision Corporation with a copyright date of 2007, and downloaded by Applicant on Mar. 3, 2010.

Search Report and Written Opinion from corresponding FR Application No. 1161843 dated Sep. 24, 2013.

Machine translation and Office Action issued in connection with corresponding JP Application No. 2011-272891 dated Dec. 15, 2015.

Notice of Allowance issued in connection with corresponding JP Application No. 2011-272891 dated Jul. 5, 2016.

* cited by examiner

SYSTEM AND METHOD FOR DETECTING SPALL WITHIN A TURBINE ENGINE

BACKGROUND OF THE INVENTION

The subject matter disclosed herein relates to a system and method for detecting spall within a turbine engine.

Certain gas turbine engines include a turbine having viewing ports configured to facilitate monitoring of various components within the turbine. For example, a pyrometry system may receive radiation signals through the viewing ports to measure the temperature of certain components within a hot gas path of the turbine. The pyrometry system may include an optical sensor configured to measure the intensity of radiation emitted by the turbine components within a fixed wavelength range. As will be appreciated, by assuming an emissivity, the temperature of the components may be determined based on the radiation intensity at a particular wavelength.

Unfortunately, emissivity of the components may vary over time due to changes in temperature, buildup of residue on the components and/or oxidation of turbine components. In addition, emissivity measurements may be affected by dirt accumulation on the viewing port window. Furthermore, turbine components which include a thermal barrier coating (TBC) may be subject to spall, a condition in which portions of the TBC detach from the surface of the component, thereby exposing the base material. As will be appreciated, the emissivity of the base material may be significantly higher than the emissivity of the TBC. Consequently, pyrometry systems which assume a constant emissivity may provide inaccurate temperature measurements for spalling turbine components. For example, a pyrometry system configured to measure radiation within a fixed wavelength range may detect an increased radiant intensity from a turbine component having a spalled region. Because the pyrometry system is unable to distinguish between increased temperatures and increased emissivity, the pyrometry system will report a higher temperature. Consequently, an operator or an automatic system may deactivate the turbine engine to determine the cause of the increased turbine component temperature. Because the actual temperature of the turbine component may be within a desired operating range, such an operation may unnecessarily reduce the availability of the turbine engine.

BRIEF DESCRIPTION OF THE INVENTION

In one embodiment, a system includes a multi-spectral pyrometry system configured to receive a broad wavelength band radiation signal from a turbine component, to split the broad wavelength band radiation signal into multiple narrow wavelength band radiation signals, to determine emissivity of the turbine component based on the narrow wavelength band radiation signals, and to detect spall on a surface of the turbine component based on the emissivity.

In another embodiment, a system includes a multi-spectral pyrometry system configured to optically communicate with an interior of a turbine. The multi-spectral pyrometry system includes a wavelength-splitting device configured to receive a broad wavelength band radiation signal from a turbine component within the interior of the turbine, and to split the broad wavelength band radiation signal into multiple narrow wavelength band radiation signals. The multi-spectral pyrometry system also includes a detector in optical communication with the wavelength-splitting device. The detector is configured to receive the narrow wavelength band radiation signals, and to output signals indicative of an intensity of each narrow wavelength band radiation signal. The multi-spectral pyrometry system further includes a controller configured to determine emissivity of the turbine component based on the output signals, and to detect spall on a surface of the turbine component based on the emissivity.

In a further embodiment, a method includes receiving a broad wavelength band radiation signal from a turbine component, and splitting the broad wavelength band radiation signal into multiple narrow wavelength band radiation signals. The method also includes determining emissivity of the turbine component based on the narrow wavelength band radiation signals, and detecting spall on a surface of the turbine component based on the emissivity.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
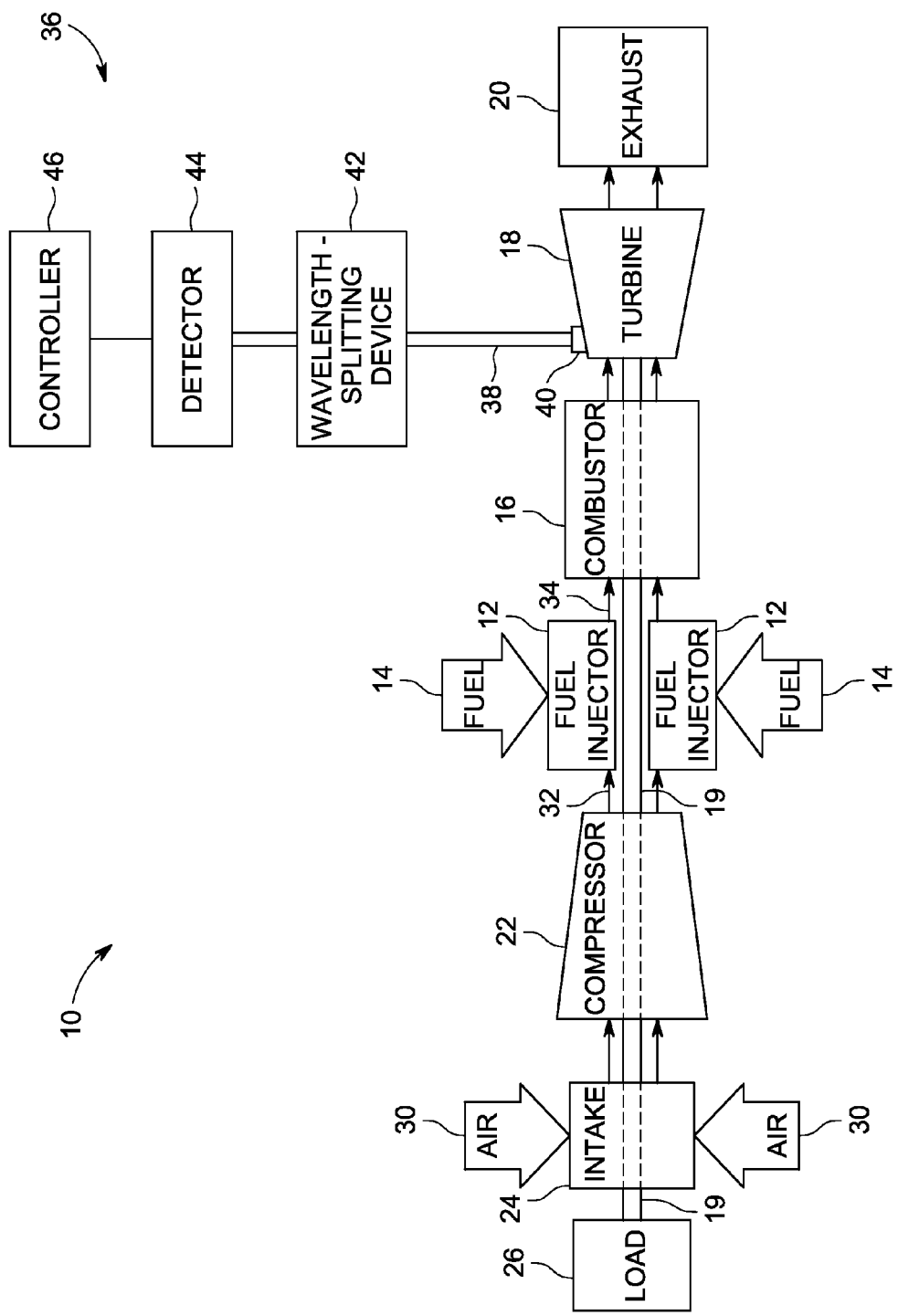
FIG. 1 is a block diagram of an embodiment of a turbine system including a multi-spectral pyrometry system configured to determine emissivity of a turbine component, and to detect spall on a surface of the turbine component based on the emissivity.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments disclosed herein, the articles "a," "an," "the," and "said" are intended to mean that there are one or more of the elements. The terms "comprising," "including," and "having" are intended to be inclusive and mean that there may be additional elements other than the listed elements.

Embodiments disclosed herein may increase the availability of a turbine engine by providing a multi-spectral pyrometry system configured to distinguish between variations in temperature and variations in emissivity. Accordingly, the pyrometry system may identify spall on certain turbine components and/or provide more accurate temperature measurements. In one embodiment, a multi-spectral pyrometry system includes a wavelength-splitting device configured to receive a broad wavelength band radiation signal from a turbine component within the interior of the turbine, and to split the broad wavelength band radiation signal into multiple narrow wavelength band radiation signals. The multi-spectral pyrometry system also includes a detector in optical communication with the wavelength-splitting device. The detector is configured to receive the narrow wavelength band radiation signals, and to output signals indicative of an intensity of each narrow wavelength band radiation signal. The multi-spectral pyrometry system further includes a controller configured to determine emissivity of the turbine component based on the output signals, and to detect spall on a surface of the turbine component based on the emissivity. The controller may also be configured to determine temperature of the turbine component based on the signals. Because the multi-spectral pyrometry system computes an apparent-effective emissivity, the controller may provide a more accurate temperature determination than temperature determinations based on a single wavelength measurement. In certain embodiments, the controller may be configured to determine an area of spall on the surface of the turbine component based on the emissivity. If the area exceeds a threshold value, the controller may inform an operator and/or automatically deactivate the turbine engine to substantially reduce or eliminate the possibility of excessive wear associated with loss of the TBC coating.

Turning now to the drawings, FIG. 1 is a block diagram of a turbine system 10 including a multi-spectral pyrometry system configured to determine emissivity of a turbine component, and to detect spall on a surface of the turbine component based on the emissivity. The turbine system 10 includes a fuel injector 12, a fuel supply 14, and a combustor 16. As illustrated, the fuel supply 14 routes a liquid fuel and/or gas fuel, such as natural gas, to the gas turbine system 10 through the fuel injector 12 into the combustor 16. As discussed below, the fuel injector 12 is configured to inject and mix the fuel with compressed air. The combustor 16 ignites and combusts the fuel-air mixture, and then passes hot pressurized exhaust gas into a turbine 18. As will be appreciated, the turbine 18 includes one or more stators having fixed vanes or blades, and one or more rotors having blades which rotate relative to the stators. The exhaust gas passes through the turbine rotor blades, thereby driving the turbine rotor to rotate. Coupling between the turbine rotor and a shaft 19 will cause the rotation of the shaft 19, which is also coupled to several components throughout the gas turbine system 10, as illustrated. Eventually, the exhaust of the combustion process may exit the gas turbine system 10 via an exhaust outlet 20.

A compressor 22 includes blades rigidly mounted to a rotor which is driven to rotate by the shaft 19. As air passes through the rotating blades, air pressure increases, thereby providing the combustor 16 with sufficient air for proper combustion. The compressor 22 may intake air to the gas turbine system 10 via an air intake 24. Further, the shaft 19 may be coupled to a load 26, which may be powered via rotation of the shaft 19. As will be appreciated, the load 26 may be any suitable device that may use the power of the rotational output of the gas turbine system 10, such as a power generation plant or an external mechanical load. For example, the load 26 may include an electrical generator, a propeller of an airplane, and so forth. The air intake 24 draws air 30 into the gas turbine system 10 via a suitable mechanism, such as a cold air intake. The air 30 then flows through blades of the compressor 22, which provides compressed air 32 to the combustor 16. In particular, the fuel injector 12 may inject the compressed air 32 and fuel 14, as a fuel-air mixture 34, into the combustor 16. Alternatively, the compressed air 32 and fuel 14 may be injected directly into the combustor for mixing and combustion.

As illustrated, the turbine system 10 includes a multi-spectral pyrometry system 36 optically coupled to the turbine 18. In the illustrated embodiment, the pyrometry system 36 includes an imaging optical system or optical connection 38 (e.g., fiber optic cable, optical waveguide, etc.) extending between a viewing port 40 into the turbine 18 and a wavelength-splitting device 42. While the illustrated viewing port 40 is directed toward an inlet of the turbine 18, it should be appreciated that the viewing port 40 may be positioned at various locations along the turbine 18. As discussed in detail below, the wavelength-splitting device 42 is configured to split a radiation signal from an interior of the turbine into multiple narrow wavelength band radiation signals. A detector 44 optically coupled to the wavelength-splitting device 42 is configured to output signals indicative of an intensity of each narrow wavelength band radiation signal. In the illustrated embodiment, the detector 44 is communicatively coupled to a controller 46 which is configured to determine emissivity of a turbine component within the turbine interior based on the signals, and to detect spall on a surface of the turbine component based on the emissivity. As discussed in detail below, the controller 46 may also be configured to determine temperature of the turbine component based on the output signals. In certain embodiments, the broad wavelength band radiation signal may be a two-dimensional image of the turbine component. In such an embodiment, the wavelength splitting device may be configured to split the broad wavelength band image into multiple narrow wavelength band images, and the detector may be configured to output signals indicative of a two-dimensional intensity map of each narrow wavelength band image. Furthermore, the controller may be configured to determine a two-dimensional temperature map of the turbine component based on the output signals, thereby enabling thermal stress within the component to be determined by measuring a thermal gradient across the turbine component. In further embodiments, the controller may be configured to determine an area of spall on the surface of the turbine component based on the emissivity. If the area exceeds a threshold value, the controller 46 may inform an operator and/or automatically deactivate the turbine engine 10 to substantially reduce or eliminate the possibility of excessive wear associated with loss of the TBC coating.

Figure 2:
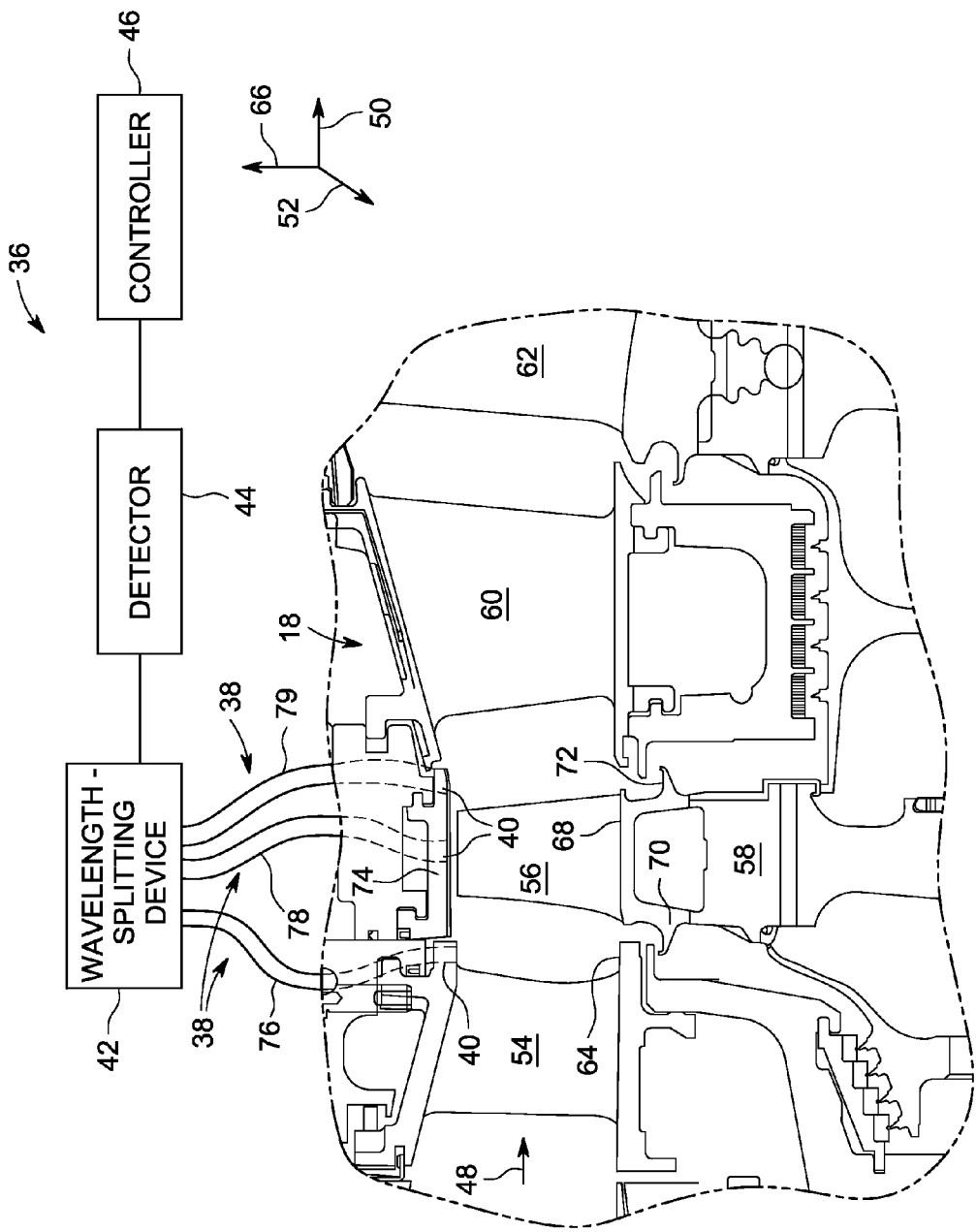
FIG. 2 is a cross-sectional view of an exemplary turbine section, illustrating various turbine components that may be monitored by an embodiment of the multi-spectral pyrometry system.

FIG. 2 is a cross-sectional view of an exemplary turbine section, illustrating various turbine components that may be monitored by an embodiment of the multi-spectral pyrometry system 36. As illustrated, exhaust gas/combustion products 48 from the combustor 16 flows into the turbine 18 in an axial direction 50 and/or a circumferential direction 52. The illustrated turbine 18 includes at least two stages, with the first two stages shown in FIG. 2. Other turbine configurations may include more or fewer turbine stages. For example, a turbine may include 1, 2, 3, 4, 5, 6, or more turbine stages. The first turbine stage includes vanes 54 and blades 56 substantially equally spaced in the circumferential direction 52 about the turbine 18. The first stage vanes 54 are rigidly mounted to the turbine 18 and configured to direct combustion gases toward the blades 56. The first stage blades 56 are mounted to a rotor 58 that is driven to rotate by the exhaust gas 48 flowing through the blades 56. The rotor 58, in turn, is coupled to the shaft 19, which drives the compressor 22 and the load 26. The exhaust gas 48 then flows through second stage vanes 60 and second stage blades 62. The second stage blades 62 are also coupled to the rotor 58. As the exhaust gas 48 flows through each stage, energy from the gas is converted into rotational energy of the rotor 58. After passing through each turbine stage, the exhaust gas 48 exits the turbine 18 in the axial direction 50.

In the illustrated embodiment, each first stage vane 54 extends outward from an endwall 64 in a radial direction 66. The endwall 64 is configured to block hot exhaust gas 48 from entering the rotor 58. A similar endwall may be present adjacent to the second stage vanes 60, and subsequent downstream vanes, if present. Similarly, each first stage blade 56 extends outward from a platform 68 in the radial direction 66. As will be appreciated, the platform 68 is part of a shank 70 which couples the blade 56 to the rotor 58. The shank 70 also includes a seal, or angel wing, 72 configured to block hot exhaust gas 48 from entering the rotor 58. Similar platforms and angel wings may be present adjacent to the second stage blades 62, and subsequent downstream blades, if present. Furthermore, a shroud 74 is positioned radially outward from the first stage blades 56. The shroud 74 is configured to minimize the quantity of exhaust gas 48 that bypasses the blades 56. Gas bypass is undesirable because energy from the bypassing gas is not captured by the blades 56 and translated into rotational energy. While the multi-spectral pyrometry system 36 is described below with reference to monitoring components within the turbine 18 of a gas turbine engine 10, it should be appreciated that the pyrometry system 36 may be employed to monitor components within other rotating and/or reciprocating machinery, such as a turbine in which steam or another working fluid passes through turbine blades to provide power or thrust. In addition, the pyrometry system 36 may be utilized to monitor an interior of a reciprocating engine, such as a gasoline or diesel powered internal combustion engine.

As will be appreciated, various components within the turbine 18 (e.g., vanes 54 and 60, blades 56 and 62, endwalls 64, platforms 68, angel wings 72, shrouds 74, etc.) will be exposed to the hot exhaust gas 48 from the combustor 16. Consequently, it may be desirable to measure a temperature of certain components during operation of the turbine 18 to ensure that the temperature remains within a desired range and/or to monitor thermal stress within the components. For example, the multi-spectral pyrometry system 36 may be configured to determine a temperature of the first stage turbine blades 56. In further embodiments, the pyrometry system 36 may be configured to determine a two-dimensional temperature map of the blades 56. As will be appreciated, the two-dimensional temperature map may be utilized to determine a temperature gradient across each blade 56, thereby facilitating computation of thermal stress within the blade 56.

In addition to increasing the blade temperature, the hot exhaust gas 48 may cause thermal barrier coating (TBC) to detach from a surface of the blades 56 and/or other components within the turbine 18, thereby exposing the base material to the hot gas 48. This condition may be known as spall, and may substantially increase wear on the turbine components. Because the base material may have a substantially higher emissivity than the TBC, the multi-spectral pyrometry system 36 may be configured to detect spall by identifying regions of increased emissivity. In certain embodiments, the pyrometry system may be configured to determine an area of spall on the surface of each turbine component based on the emissivity. If the area exceeds a threshold value, the controller may inform an operator and/or automatically deactivate the turbine engine to substantially reduce or eliminate the possibility of excessive wear associated with loss of the TBC coating.

The illustrated embodiment includes three optical connections 38 to optically couple the viewing ports 40 to the wavelength-splitting device 42. As illustrated, a first optical connection 76 is coupled to a viewing port 40 positioned upstream of the blade 56 and angled toward the blade 56, a second optical connection 78 is coupled to another viewing port 40 positioned radially outward from the blade 56 and directed toward a circumferential side of the blade 56, and a third optical connection 79 is coupled to a third viewing port 40 positioned downstream from the blade 56 and angled in an upstream direction. As will be appreciated, the viewing ports 40 may be angled in the axial direction 50, circumferential direction 52 and/or radial direction 66 to direct the viewing ports 40 toward desired regions of the blade 56. In alternative embodiments, more or fewer viewing ports 40 and optical connections 38 may be employed to obtain radiation signals from the first stage blade 56. For example, certain embodiments may employ 1, 2, 3, 4, 5, 6, 7, 8, or more viewing ports 40 and a corresponding number of optical connections 38 to convey radiation signals of the blade 56 to the wavelength-splitting device 42. As will be appreciated, the more viewing ports 40 and optical connections 38 employed, the more regions of the blade 56 that may be monitored. As previously discussed, the optical connections 38 may include a fiber optic cable or an optical imaging system (e.g., a rigid imaging optical waveguide system), for example. It should also be appreciated that certain embodiments may omit the optical connections 38, and the wavelength-splitting device 42 may be directly optically coupled to the viewing ports 40.

While the viewing ports 40 are directed toward the first stage blades 56 in the illustrated embodiment, it should be appreciated that the viewing ports 40 may be directed toward other turbine components in alternative embodiments. For example, one or more viewing ports 40 may be directed toward the first stage vanes 54, the second stage vanes 60, the second stage blades 62, the endwalls 64, the platforms 68, the angel wings 72, the shrouds 74, or other components within the turbine 18. Further embodiments may include viewing ports 40 directed toward multiple components within the turbine 18. Similar to the first stage blades 56, the multi-spectral pyrometry system 36 may determine a temperature and/or an emissivity of the turbine component to identify high thermal stress and/or excessive loss of TBC.

As previously discussed, the optical connections 38 (e.g., fiber optic cable, optical waveguide, etc.) convey a radiation signal from the turbine interior to the wavelength-splitting device 42. The wavelength-splitting device 42, in turn, is configured to split the broad wavelength band radiation signal into multiple narrow wavelength band radiation signals, and to convey the narrow wavelength band radiation signals to the detector 44. The detector 44 may be configured to capture multiple radiation signals over a period of time. As will be appreciated, certain turbine components, such as the first stage blades 56 described above, may rotate at high speed along the circumferential direction 52 of the turbine 18. Consequently, to capture a radiation signal (e.g., image) from such components, the detector 44 may be configured to operate at a frequency sufficient to provide the controller 46 with a substantially still image of each component. For example, in certain embodiments, the detector 44 may be configured to output the signals indicative of the intensity of each radiation signal at a frequency greater than approximately 100,000, 200,000, 400,000, 600,000, 800,000, or 1,000,000 Hz, or more. In further embodiments, the detector 44 may be configured to output the signals indicative of the intensity of each image with an integration time of approximately 10, 5, 3, 2, 1, or 0.5 microseconds, or less. In this manner, emissivity may be measured for each turbine component, thereby enabling instant detection of spall on the surface of the component.

In certain embodiments, the optical connections 38 may be coupled to a multiplexer within the wavelength-splitting device 42 to provide the detector 44 with radiation signals from each observation point. As will be appreciated, radiation signals from each optical connection 38 may be multiplexed in space or time. For example, in certain embodiments, the detector 44 may be configured to capture two-dimensional intensity maps of each narrow wavelength band radiation signal (e.g., image). In such embodiments, if the multiplexer is configured to multiplex the images in space, each image may be projected onto a different portion of the detector 44. In this configuration, an image from the first optical connection 76 may be directed toward a first portion (e.g., first third) of the detector 44, an image from the second optical connection 78 may be directed toward a second portion (e.g., second third) of the detector 44, and an image from the third optical connection 79 may be directed toward a third portion (e.g., third third). As a result, the detector 44 may capture each image at one-third resolution. In other words, spatial resolution is inversely proportional to the number of spatially multiplexed signals. As will be appreciated, lower resolution provides the controller 46 with less spatial coverage of the turbine component than higher resolution. Therefore, the number of spatially multiplexed signals may be limited by the minimum resolution sufficient for the controller 46 to establish a desired two-dimensional temperature map of the turbine component and/or a desired two-dimensional emissivity map of the turbine component. For example, in certain embodiments, the detector 44 may be configured to capture images having a spatial resolution of less than about 1000 microns, less than about 750 microns, less than about 500 microns, or less than about 250 microns. Consequently, minute features of each turbine component may be identified, such as blocked film cooling holes on turbine blades.

Alternatively, images provided by the optical connections 38 may be multiplexed in time. For example, the detector 44 may alternately capture an image from each optical connection 38 using the entire resolution of the detector 44. Using this technique, the full resolution of the detector 44 may be utilized, but the capture frequency may be reduced proportionally to the number of observation points scanned. For example, if two observation points are scanned and the detector frequency is 100,000 Hz, the detector 44 is only able to scan images from each observation point at 50,000 Hz. Therefore, the number of temporally multiplexed signals may be limited by the desired scanning frequency.

Figure 3:
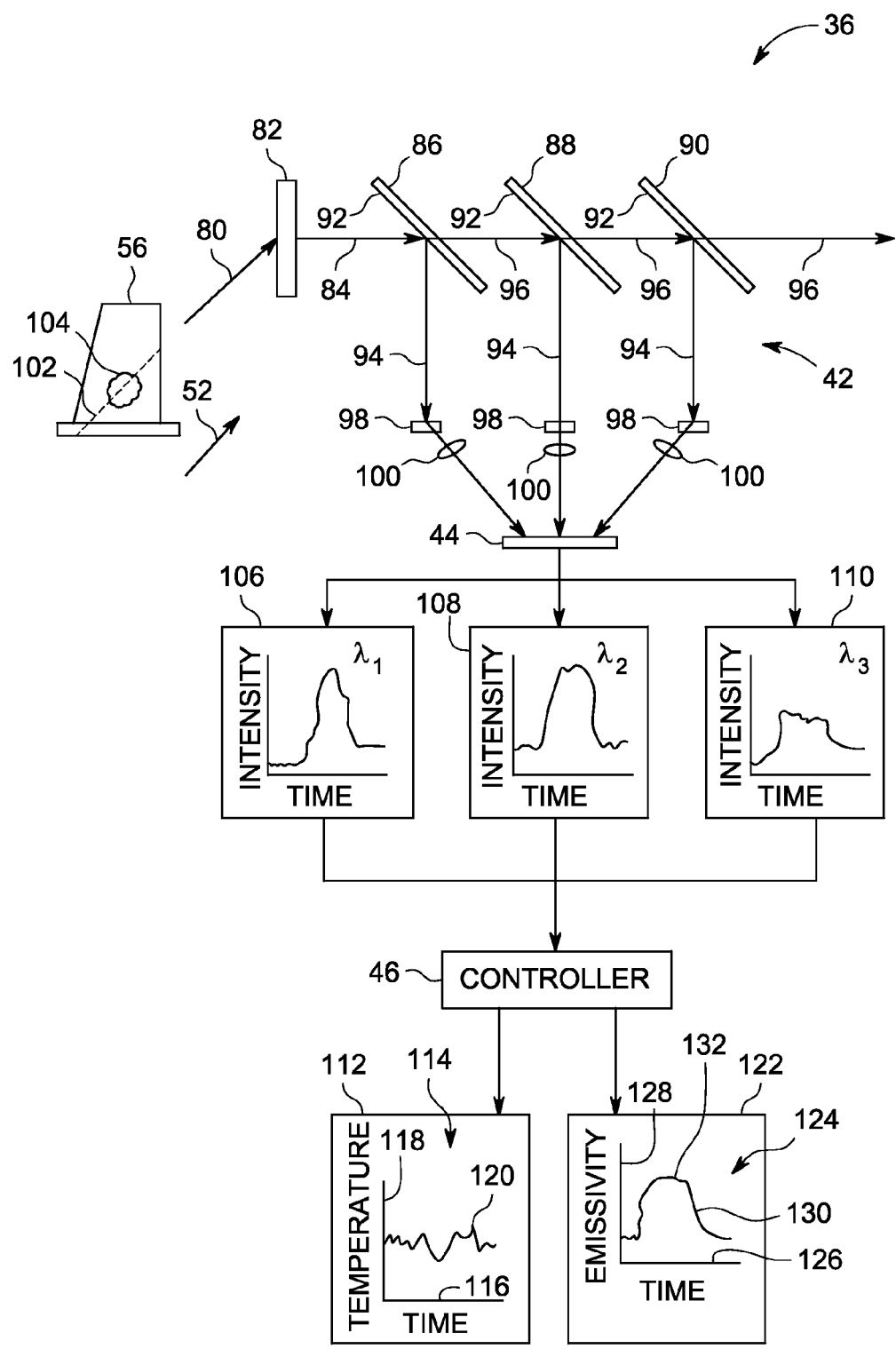
FIG. 3 is a schematic diagram of an embodiment of the multi-spectral pyrometry system having a wavelength-splitting device employing multiple dichroic mirrors to convert a broad wavelength band radiation signal into multiple narrow wavelength band radiation signals.

FIG. 3 is a schematic diagram of an embodiment of the multi-spectral pyrometry system 36 having a wavelength-splitting device 42 employing multiple dichroic mirrors to convert a broad wavelength band radiation signal into multiple narrow wavelength band radiation signals. As illustrated, the pyrometry system 36 is directed toward a first stage turbine blade 56. However, it should be appreciated that the pyrometry system 36 may be directed toward other turbine components (e.g., vanes 54 and 60, blades 62, endwalls 64, platforms 68, angel wings 72, shrouds 74, etc.) in alternative embodiments. As will be appreciated, electromagnetic radiation may be emitted from the blade 56 and captured by the pyrometry system 36 as a broad wavelength band radiation signal 80. Such a radiation signal 80 may include radiation having a wavelength within the infrared and/or visible regions of the electromagnetic spectrum.

Because the combustion products 48 may flow between the viewing port 40 and the blade 56, only certain wavelength bands may be transmitted to the imaging system 36. For example, certain combustion products species, such as water vapor and carbon dioxide, absorb and emit radiation over a wide range of wavelengths. As a result, during operation of the gas turbine engine 10, only a fraction of wavelengths emitted by the blade 56 reach the pyrometry system 36 with sufficient intensity and negligible interference for accurate intensity measurement. Consequently, the pyrometry system 36 may be configured to measure the intensity of certain wavelengths which are more likely to pass through the gas 48 without significant absorption or interference to determine the emissivity and/or temperature of the blade 56. For example, wavelengths within the red portion of the visible spectrum and/or within the near infrared spectrum may pass through the combustion products 48 with less absorption than other frequency ranges. Therefore, certain embodiments may utilize such frequency ranges for emissivity and/or temperature determination. However, it should be appreciated that alternative embodiments may measure an intensity of electromagnetic radiation within other portions of the visible, infrared and/or ultraviolet spectra.

As will be appreciated, temperature of a component may be determined by measuring the intensity of electromagnetic radiation emitted by the component at a particular wavelength. For example, assuming emissivity is one (Black Body assumption), Planck's Law may be utilized to compute temperature from a measured radiation intensity. However, because actual components may have an emissivity less than one, certain pyrometry systems assume a constant emissivity value. Because emissivity may vary based on a number of factors including temperature and wavelength, such an assumption may produce inaccurate temperature measurements. For example, the emissivity of a turbine component may vary as residue from the combustion products 48 accumulates on the component. In addition, residue and/or other debris may build up on the viewing port 40, thereby reducing the radiation intensity received the by the wavelength-splitting device 42. Furthermore, combustion products such as soot may also contaminate the radiation signal from the component. As discussed in detail below, turbine components which include TBC may be subject to spall, a condition in which portions of the TBC detach from the surface of the component, thereby exposing the base material. As will be appreciated, the emissivity of the base material may be significantly higher than the emissivity of the TBC. Consequently, pyrometry systems which assume a constant emissivity may provide inaccurate temperature measurements for spalling turbine components. For example, a pyrometry system may detect an increased radiant intensity from a turbine component having a spalled region. Because current pyrometry systems are unable to distinguish between increased temperatures and increased emissivity, such pyrometry systems will report a higher temperature.

In the illustrated embodiment, the multi-spectral pyrometry system 36 is configured to determine the emissivity of the turbine component, thereby facilitating accurate temperature calculations and enabling the controller 46 to detect spall on the surface of the component. Specifically, the pyrometry system 36 is configured to split a broad wavelength band radiation signal into multiple narrow wavelength band radiation signals, and to measure the intensity of each narrow wavelength band radiation signal. In such a configuration, the controller 46, via multichannel algorithms, may be able to compute an apparent-effective emissivity of the turbine component such that a more accurate temperature may be determined. In addition, because the emissivity of the base material may be higher than the emissivity of the TBC, the controller 46 may detect spall on the surface of the turbine component by identifying regions of increased emissivity.

As illustrated, the broad wavelength band radiation signal 80 first passes through an optical collimator 82 which converts the radiation emitted from the blade 56 into a collimated beam 84. The collimated beam 84 then passes through a series of dichroic mirrors 86, 88 and 90 where the broad wavelength band radiation signal 80 is converted into a series of narrow wavelength band radiation signals. As will be appreciated, dichroic mirrors include a reflective surface configured to reflect radiation of a desired wavelength range, while allowing the remaining radiation to pass through. Specifically, the first dichroic mirror 86 includes a coating 92 configured to reflect radiation having a narrow wavelength band. For example, the reflected radiation may have a wavelength range of less than approximately 200, 150, 100, 50, 30, 20, 10, 5, 3, or 1 nm, or less. The radiation 96 passing through the first dichroic mirror 86 may have a wavelength range including each wavelength of the collimated beam 84 except for the wavelengths reflected by the first dichroic mirror 86.

The radiation corresponding to the narrow wavelength band radiation signal 94 may then pass through an optical device 98, such as a mirror or prism, configured to direct the radiation toward the detector 44. Before reaching the detector 44, the radiation may pass through a lens 100 which focuses the narrow wavelength band radiation signal 94 onto the detector 44. In certain embodiments, the optical device 98 and/or the lens 100 may include a filter configured to further narrow the wavelength band of the radiation signal 94. For example, the optical device 98 and/or the lens 100 may narrow the wavelength range to less than approximately 200, 150, 100, 50, 30, 20, 10, 5, 3, or 1 nm, or less.

The radiation 96 having wavelengths not reflected by the first dichroic mirror 86 will pass through the first mirror 86 and be incident upon the second dichroic mirror 88. Similar to the first dichroic mirror 86, the second mirror 88 is configured to reflect radiation having a narrow wavelength band, while facilitating passage of the remaining wavelengths. The reflected radiation may then be directed toward the detector 44 in a similar manner to the reflected radiation described above with regard to the first dichroic mirror 86. The dichroic mirror 90 may function in a similar manner to provide radiation corresponding to an additional narrow wavelength band radiation signal to the detector 44. In this configuration, the detector 44 will receive three narrow wavelength band radiation signals 94, each having a different wavelength range. While three dichroic mirrors 86, 88 and 90 are employed in the illustrated embodiment to split the broad wavelength band radiation signal 80 into three narrow wavelength band radiation signals 94, it should be appreciated that more or fewer dichroic mirrors may be employed in alternative embodiments. For example, certain embodiments may include 2, 3, 4, 5, 6, 7, 8, or more dichroic mirrors to split the broad wavelength band radiation signal 80 into a corresponding number of narrow wavelength band radiation signals 94.

As previously discussed, the lenses 100 are configured to focus the narrow wavelength band radiation signals 94 onto the detector 44. In the illustrated configuration, a single detector 44 is employed to output a signal indicative of an intensity of each narrow wavelength band radiation signal 94. Consequently, each lens 100 is configured to focus each narrow wavelength band radiation signal 94 onto a respective non-overlapping region of the detector 44. In this manner, the detector 44 may monitor the intensity of each narrow wavelength band radiation signal 94. In certain embodiments, multiple detectors 44 may be employed to monitor the intensity of each narrow wavelength band radiation signal 94. For example, each narrow wavelength band radiation signal 94 may be focused onto a separate detector 44. In such a configuration, each detector 44 may include a photodiode configured to output a signal indicative of an aggregate intensity of each narrow wavelength band radiation signal 94.

While the illustrated wavelength-splitting device includes dichroic mirrors to split the broad wavelength band radiation signal into multiple narrow wavelength band radiation signals, it should be appreciated that other wavelength-splitting devices may be employed in alternative embodiments. For example, in certain embodiments, the wavelength-splitting device may include a signal splitter configured to split the broad wavelength band radiation signal into multiple duplicate radiation signals, and multiple narrow wavelength band filters configured to receive a respective duplicate radiation signal and to filter the respective duplicate radiation signal to obtain a respective narrow wavelength band radiation signal. In further embodiments, the wavelength-splitting device may include a multichannel wavelength separation prism configured to split the broad wavelength band radiation signal into multiple narrow wavelength band radiation signals. In certain embodiments, the detector 44 may include multiple detector elements such that signals indicative of a two-dimensional intensity map may be generated. In such embodiments, the wavelength-splitting device may include a filter mask having multiple narrow wavelength band filters, in which each narrow wavelength band filter is in optical communication with a respective detector element of the detector.

As the turbine blades 56 rotate in the circumferential direction 52, the wavelength-splitting device 42 scans a line of sight (LOS) 102 across each blade 56. As will be appreciated, the angle of the LOS 102 is at least partially dependent on the location and orientation of the viewing port 40 and the optical connection 38. In certain embodiments, each turbine blade 56 is coated with TBC to protect a base material from the hot exhaust gas 48 flowing through the turbine 18. Unfortunately, over time, portions of the TBC may detach from the base material, thereby establishing regions of spall 104. Because the base material may have a significantly higher emissivity than the TBC, the regions of spall 104 may emit more radiation than the remainder of the TBC coated blade 56. Consequently, the detector 44 will output signals indicative of a higher intensity as the line of sight 102 crosses the spalling region 104.

As previously discussed, the detector 44 is configured to receive the narrow wavelength band radiation signals 94, and to output signals indicative of an intensity of each narrow wavelength band radiation signal. In the illustrated embodiment, the detector 44 is configured to receive three narrow wavelength band radiation signals having different wavelength ranges. Consequently, the detector 44 is configured to output first signals 106 indicative of an intensity of the first narrow wavelength band radiation signal, second signals 108 indicative of an intensity of the second narrow wavelength band radiation signal, and third signals 110 indicative of an intensity of the third narrow wavelength band radiation signal. As illustrated, the intensity of each narrow wavelength band radiation signal varies over time as the turbine blade 56 rotates. Specifically, the intensity increases as the LOS 102 crosses the spalling region 104 due to the higher emissivity of the base material. As a result, each signal 106, 108 and 110 includes a local maximum corresponding to the region of spall 104 on the turbine blade 56.

As previously discussed, only a fraction of wavelengths emitted by the blade 56 reach the pyrometry system 36 with sufficient intensity and negligible interference for accurate intensity measurement. Consequently, the pyrometry system 36 may be configured to measure the intensity of certain wavelengths which are more likely to pass through the gas 48 without significant absorption or interference to determine the emissivity and/or temperature of the blade 56. In the illustrated embodiment, the first signals 106 may represent an intensity of radiation having a wavelength range of approximately 1000 to 1100 nm, 1025 to 1075 nm, 1050 to 1070 nm, or about 1064 nm. The second signals 108 may represent an intensity of radiation having a wavelength range of approximately 1200 to 1300 nm, 1225 to 1275 nm, 1240 to 1260 nm, or about 1250 nm. The third signals 110 may represent an intensity of radiation having a wavelength range of approximately 1550 to 1650 nm, 1575 to 1625 nm, 1590 to 1610 nm, or about 1600 nm. As will be appreciated, other wavelength ranges within the visible and/or infrared spectra may be utilized in alternative embodiments. For example, certain embodiments may be configured to monitor radiation within a wavelength range of approximately 600 to 700 nm and/or 2100 to 2300 nm. Furthermore, while three wavelength ranges are monitored in the illustrated embodiment, it should be appreciated that alternative embodiments may employ 2, 3, 4, 5, 6, 7, 8, or more wavelengths to determine the emissivity and/or temperature of the turbine component.

In the illustrated embodiment, the controller 46 is configured to receive the signals 106, 108 and 110, and to determine a temperature and/or emissivity of the turbine component based on the signals. For example, the controller 46 may be configured to compute a temperature 112 via multichannel algorithms that account for variations in emissivity. Consequently, the temperature 112 may be more accurate than temperature calculations based on a single wavelength measurement. As illustrated, the temperature is depicted as a graph 114 having an x-axis 116 representative of time and a y-axis 118 representative of temperature. A curve 120 represents the temperature of the turbine blade 56 as a function of time. Because the turbine blade 56 rotates in the circumferential direction 52, time, as represented by the x-axis 116, is indicative of position along the LOS 102. Consequently, the curve 120 represents a one-dimensional temperature distribution across the LOS 102. As discussed in detail below, the graph 114 indicates that the temperature across the LOS 102 is substantially constant, thereby indicating that the temperature of the spall region 104 is not significantly higher than the temperature of the surrounding TBC coated portion of the turbine blade 56.

In addition, the controller 46 is configured to compute emissivity 122 based on the signals 106, 108 and 110 via multichannel algorithms. As illustrated, the emissivity is depicted as a graph 124 having an x-axis 126 representative of time and a y-axis 128 representative of emissivity. A curve 130 represents the emissivity of the turbine blade 56 as a function of time. Because the turbine blade 56 rotates in the circumferential direction 52, time, as represented by the x-axis 126, is indicative of position along the LOS 102. Consequently, the curve 130 represents a one-dimensional emissivity distribution across the LOS 102. As illustrated, the emissivity curve 130 includes a local maximum 132 corresponding to the position of the spall region 104. As previously discussed, the increase in emissivity may result from the emissivity difference between the TBC and the base material. Therefore, the controller 46 may be configured to automatically detect a spall region 104 by identifying a local maximum 132 in the emissivity curve 130. For example, the controller 46 may detect spall if the emissivity increases above a threshold value.

In certain embodiments, the controller 46 may also be configured to identify an excessive temperature (e.g., if the temperature curve 120 exceeds a threshold value), and to alert an operator of the condition and/or automatically deactivate the turbine engine 10. For example, if the cooling holes of the turbine blade 56 become blocked, the temperature of the blade may increase. The controller 46 may be configured to identify such a condition, thereby substantially reducing or eliminating the possibility of excessive wear of the turbine blade. Because the controller 46 is configured to account for variations in emissivity in the temperature calculation, the controller is capable of distinguishing between temperature variations and emissivity variations. For example, as illustrated in graphs 114 and 124, the emissivity may indicate a region of spall 104, but the temperature may remain below a desired tolerance. Consequently, the controller 46 may inform an operator of the detected spall, while allowing the turbine 18 to continue operation. In contrast, a pyrometry system configured to measure radiation within a fixed wavelength range may detect the increased radiant intensity from the spalled turbine blade 56 and report a higher temperature. Consequently, an operator or an automatic system may unnecessarily deactivate the turbine engine to determine the cause of the increased temperature. Because the illustrated pyrometry system 36 employs multichannel techniques to compute temperature and emissivity, such inaccurate temperature measurements may be substantially reduced or eliminated, thereby increasing the availability of the turbine engine 10.

While a one-dimensional LOS 102 is described above, it should be appreciated that the multi-spectral pyrometry system 36 may be configured to capture two-dimensional images of each turbine blade 56 as the blades rotate in the circumferential direction 52. For example, in certain embodiments, a field of view may traverse the surface of the blade 56, thereby enabling the multi-spectral pyrometry system 36 to capture multiple two-dimensional images. Similar to the LOS 102 described above, the wavelength-splitting device 42 may split each two-dimensional image in multiple narrow wavelength band images, thereby facilitating determination of a two-dimensional temperature map and/or a two-dimensional emissivity map.

Figure 4:
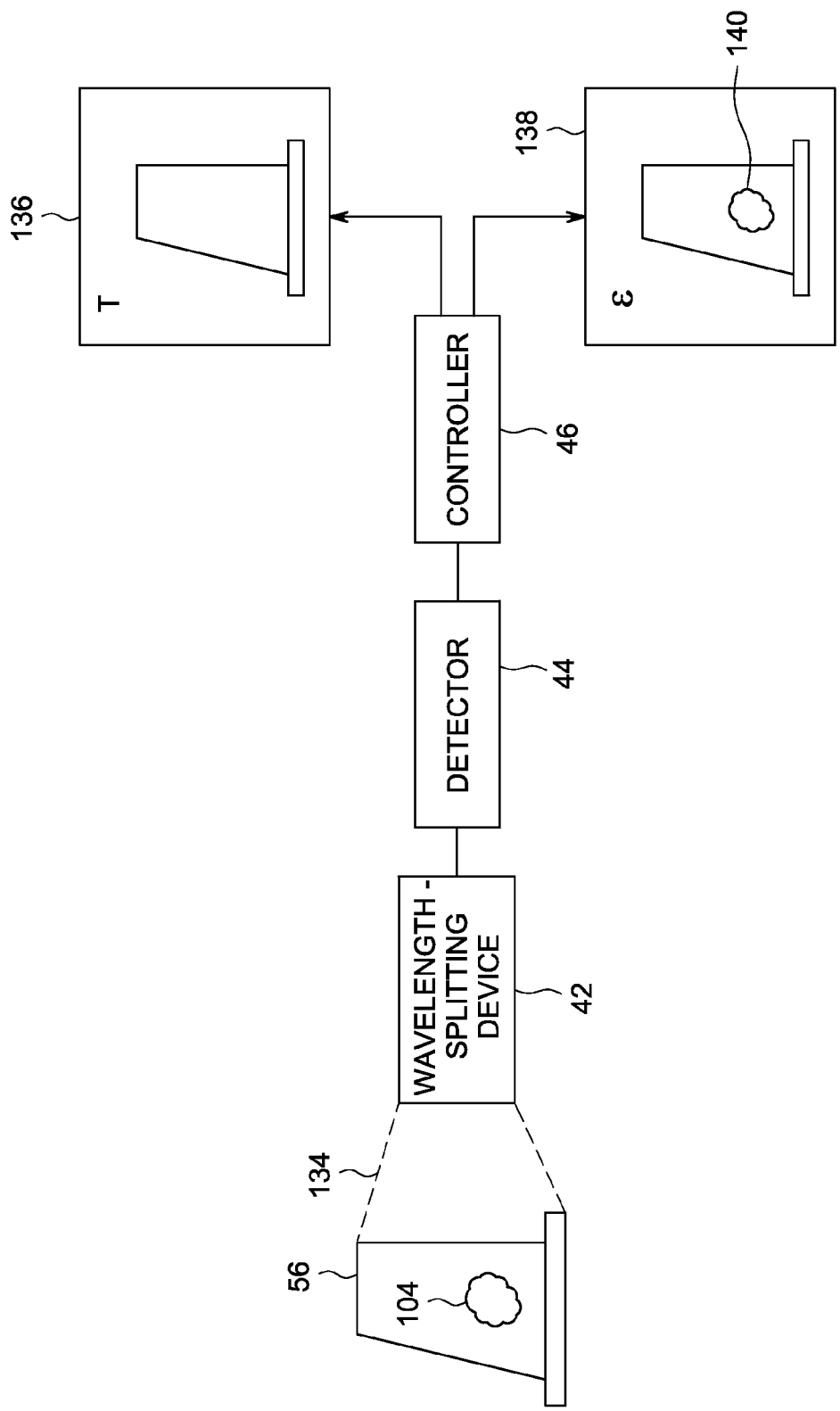
FIG. 4 is a schematic diagram of an embodiment of the multi-spectral pyrometry system having a controller configured to determine a two-dimensional temperature map of the turbine component and/or to determine an area of spall on the surface of the turbine component.

FIG. 4 is a schematic diagram of an embodiment of the multi-spectral pyrometry system 36 having a controller configured to determine a two-dimensional temperature map of the turbine component and/or to determine an area of spall on the surface of the turbine component. As illustrated, the wavelength-splitting device 42 is directed toward the turbine blade 56 such that a field of view 134 encompasses the blade. Similar to the embodiment described above with reference to FIG. 3, the wavelength-splitting device 42 is configured to split a broad wavelength band radiation signal (e.g., image) of the turbine blade 56 into multiple narrow wavelength band images (e.g., via a series of dichroic mirrors). The detector 44 is configured to receive the narrow wavelength band images and to output signals indicative of a two-dimensional intensity map of each narrow wavelength band image. The controller 46, in turn, is configured to receive the signals and to determine a two-dimensional temperature and/or emissivity map of the turbine component based on the signals.

In the illustrated embodiment, the controller 46 is configured to output a two-dimensional temperature map 136 of the turbine blade 56. Similar to the one-dimensional temperature measurement described above with reference to FIG. 3, the temperatures which comprise the two-dimensional temperature map 136 may be more accurate than temperatures measured with a single wavelength pyrometer. Specifically, measuring the intensity of multiple narrow wavelength band images enables the controller to account for variations in emissivity, thereby providing a more accurate two-dimensional temperature map. The two-dimensional temperature map may enable an operator or automated system to determine thermal stress within the component by measuring a thermal gradient across the turbine component. The pyrometry system 36 may also be configured to alert an operator and/or automatically deactivate the turbine engine 10 if the component temperature increases above a threshold value.

Furthermore, the controller 46 may be configured to output a two-dimensional emissivity map 138 of the turbine blade 56. As previously discussed, the emissivity of the turbine blade base material may be higher than the emissivity of the TBC coating. Consequently, regions of spall on the blade 56 may be detectable as areas of increased emissivity. For example, as illustrated in the two-dimensional emissivity map 138, a high emissivity region 140 substantially corresponds to the spall region 104 of the blade 56. In certain embodiments, the controller 46 may be configured to measure the area of spall based on the two-dimensional emissivity map 138. If the area exceeds a threshold value, the controller 46 may inform an operator and/or automatically deactivate the turbine engine 10 to substantially reduce or eliminate the possibility of excessive wear associated with loss of the TBC coating.

Figure 5:
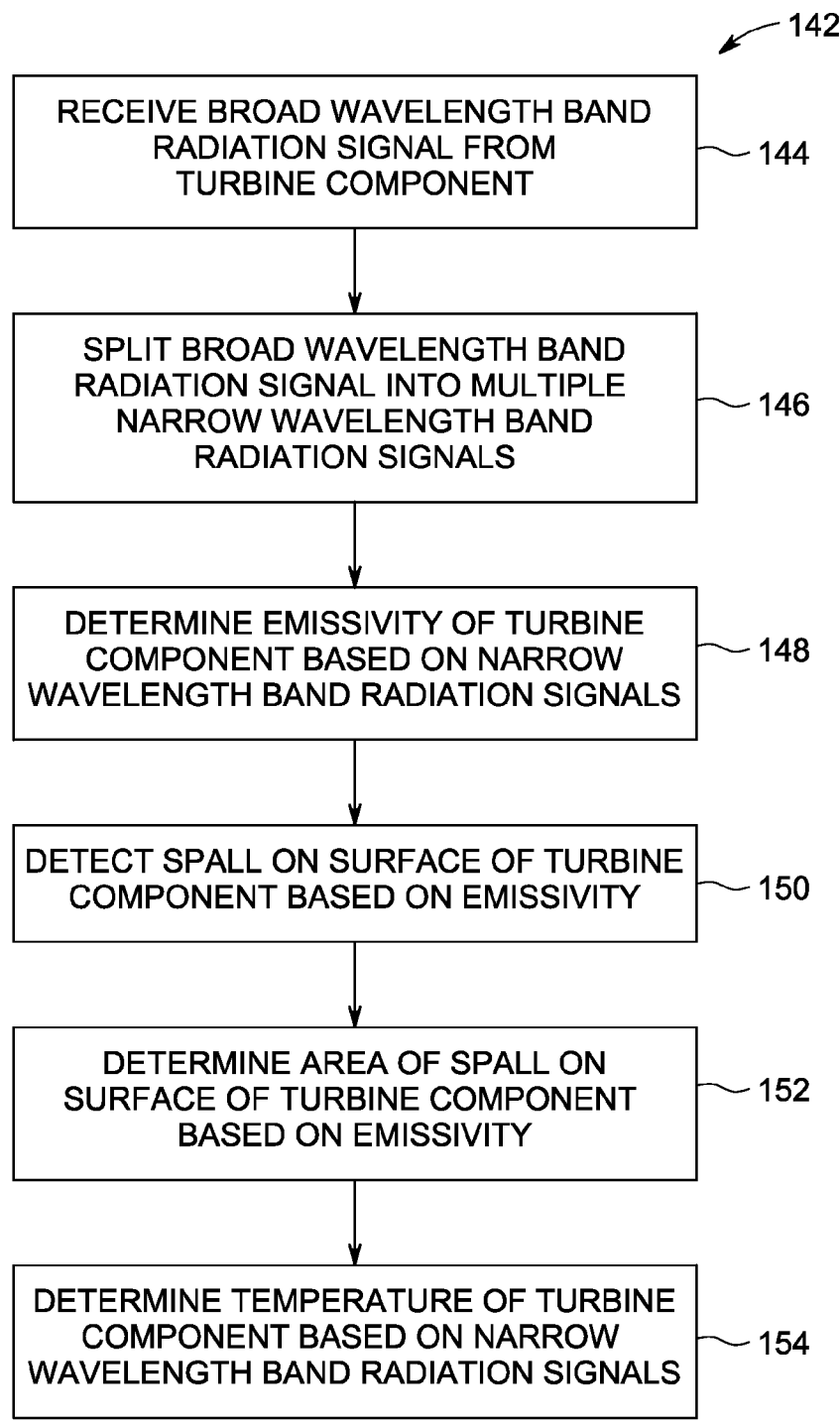
FIG. 5 is a flowchart of an exemplary method for detecting spall on a surface of the turbine component.

FIG. 5 is a flowchart of a method 142 for detecting spall on a surface of the turbine component. First, as represented by block 144, a broad wavelength band radiation signal is received from the turbine component. Next, the broad wavelength band radiation signal is split into multiple narrow wavelength band radiation signals, as represented by block 146. For example, a wavelength-splitting device utilizing multiple dichroic mirrors may be employed to convert the broad wavelength band radiation signal into the multiple narrow wavelength band radiation signals. The emissivity of the turbine component is then determined based on the narrow wavelength band radiation signals, as represented by block 148. For example, a controller may utilize multichannel algorithms to compute an apparent-effective emissivity of the turbine component. Next, as represented by block 150, spall is detected on the surface of the turbine component based on the emissivity. As previously discussed, the emissivity of a base material may be higher than the emissivity of the TBC. Consequently, regions of spall may be identified as regions of the blade having local increases in emissivity.

In certain embodiments, the multi-spectral pyrometry system may be configured to capture two-dimensional intensity maps of the turbine component. In such embodiments, an area of spall on the surface of the turbine component is determined based on the emissivity, as represented by block 152. If the area exceeds a threshold value, an operator may be informed of the condition and/or the turbine engine 10 may be automatically deactivated to substantially reduce or eliminate the possibility of excessive wear associated with loss of the TBC coating. Finally, as represented by block 154, a temperature of the turbine component is determined based on the narrow wavelength band radiation signals. Because the multi-spectral pyrometry system accounts for variations in emissivity in the temperature calculation, the temperature determination may be substantially more accurate than temperatures determined by single wavelength pyrometers. In addition, certain embodiments may be configured to generate a two-dimensional temperature map of the turbine component, thereby facilitating measurement of thermal stress within the component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A multi-spectral pyrometry system comprising:
a wavelength splitting device for receiving a broad wavelength band radiation signal from a turbine component and splitting the broad wavelength band radiation signal into at least three narrow wavelength band radiation signals, wherein a first narrow wavelength band radiation signal comprises a wavelength range of approximately 1000 to 1100 nm, a second narrow wavelength band radiation signal comprises a wavelength range of approximately 1200 to 1300 nm, and a third narrow wavelength band radiation signal comprises a wavelength range of approximately 1550 to 1650 nm; and
a controller for determining emissivity of the turbine component based on the at least three narrow wavelength band radiation signals, for detecting an area of spall on a surface of the turbine component based on the emissivity, for determining temperature of the turbine component based on the at least three narrow wavelength band radiation signals; and for using a measure of the area of spall and the temperature to determine whether to continue operation of the turbine component.

2. The system of claim 1 wherein the turbine component comprises a turbine blade, and wherein the wavelength splitting device is configured for receiving broad wavelength band radiation signals from a first viewing port located upstream of the turbine blade and angled toward the turbine blade, a second viewing port located radially outward from the turbine blade and directed to a circumferential side of the turbine blade, and a third viewing port located downstream from the turbine blade and angled in an upstream direction, wherein the wavelength splitting device is configured for splitting each of the broad wavelength band radiation signals into at least three narrow wavelength band radiation signals, wherein a first narrow wavelength band radiation signal comprises a wavelength range of approximately 1000 to 1100 nm, a second narrow wavelength band radiation signal comprises a wavelength range of approximately 1200 to 1300 nm, and a third narrow wavelength band radiation signal comprises a wavelength range of approximately 1550 to 1650 nm.

3. The system of claim 2 wherein the multi-spectral pyrometry system is configured to optically couple to the first, second and third viewing ports via a fiber optic cable or an imaging optical system.

4. The system of claim 1 wherein the controller is further configured to determine a two-dimensional temperature map of the turbine component based on the at least three narrow wavelength band radiation signals.

5. The system of claim 1 wherein the wavelength-splitting device comprises a plurality of dichroic mirrors.

6. The system of claim 1 wherein the controller is further configured to determine a two-dimensional emissivity map of the turbine component based on the at least three narrow wavelength band radiation signals.

7. A method comprising:
receiving a broad wavelength band radiation signal from a turbine component;
splitting the broad wavelength band radiation signal into at least three narrow wavelength band radiation signals, wherein a first narrow wavelength band radiation signal comprises a wavelength range of approximately 1000 to 1100 nm, a second narrow wavelength band radiation signal comprises a wavelength range of approximately 1200 to 1300 nm, and a third narrow wavelength band radiation signal comprises a wavelength range of approximately 1550 to 1650 nm;
determining emissivity of the turbine component based on the at least three narrow wavelength band radiation signals;
detecting an area of spall on a surface of the turbine component based on the emissivity;
determining temperature of the turbine component based on the at least three narrow wavelength band radiation signals; and
using a measure of the area of spall and the temperature to determine whether to continue operation of the turbine component.

8. The method of claim 7 further comprising determining a two-dimensional temperature map of the turbine component based on the at least three narrow wavelength band radiation signals.

* * * * *